July 16, 1946.  G. T. HEMMETER  2,403,923
DEVICE FOR PEELING AGRICULTURAL PRODUCTS
Filed June 25, 1943  4 Sheets-Sheet 1

INVENTOR
G. T. HEMMETER
BY
ATTORNEYS

July 16, 1946. G. T. HEMMETER 2,403,923
DEVICE FOR PEELING AGRICULTURAL PRODUCTS
Filed June 25, 1943 4 Sheets-Sheet 2

INVENTOR
G. T. HEMMETER
BY
ATTORNEYS

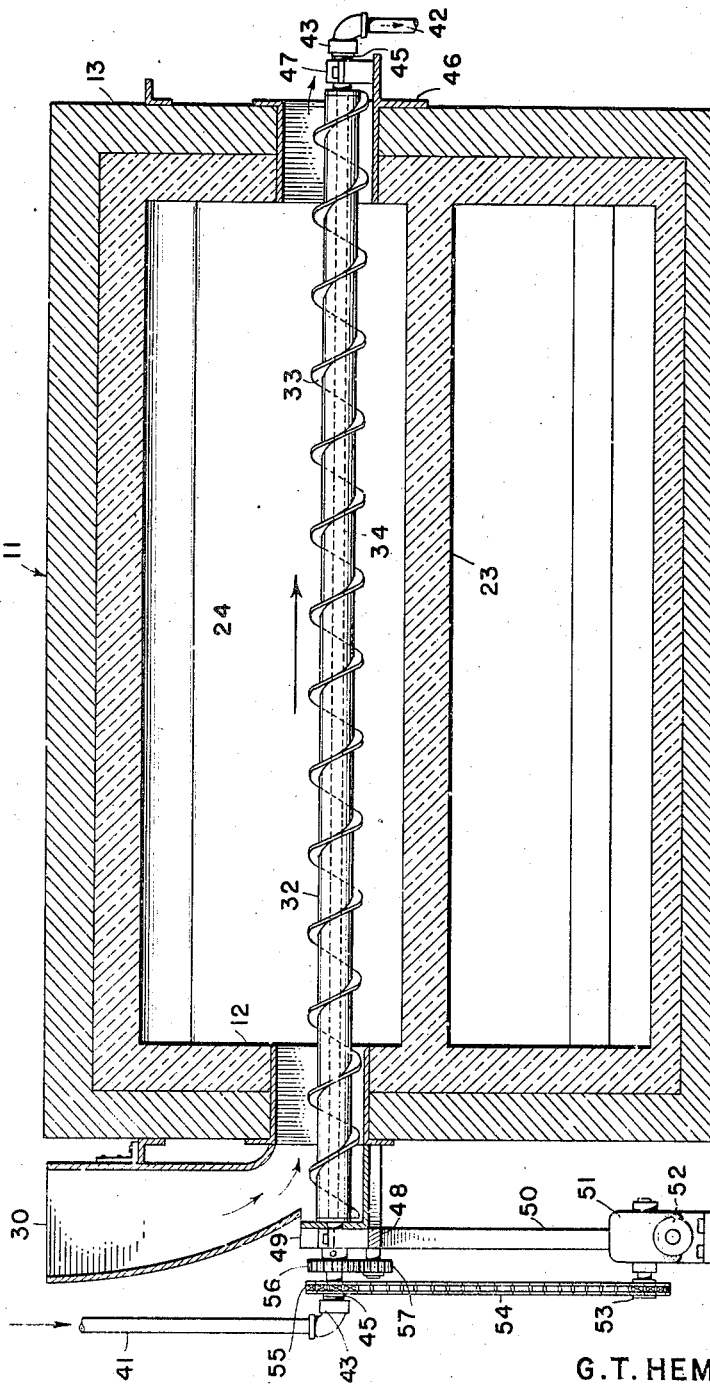

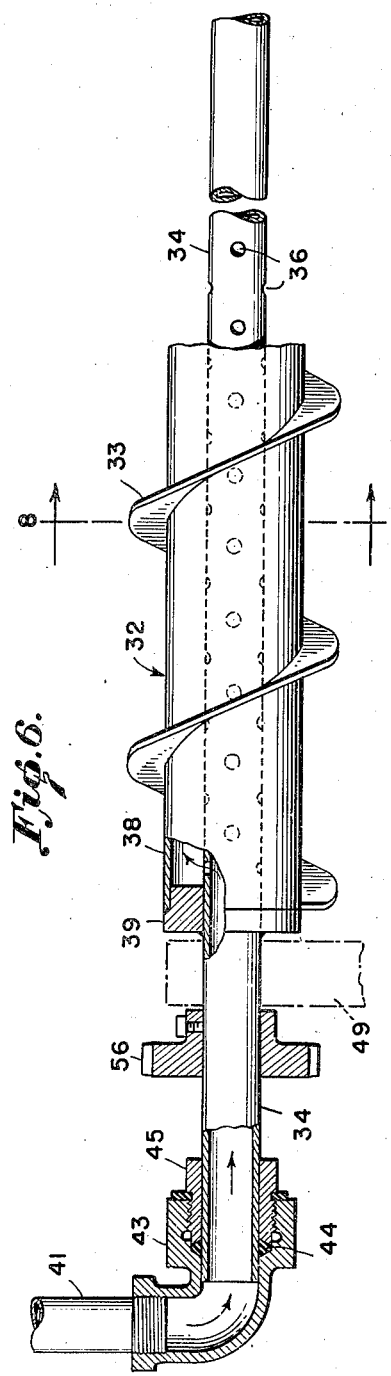
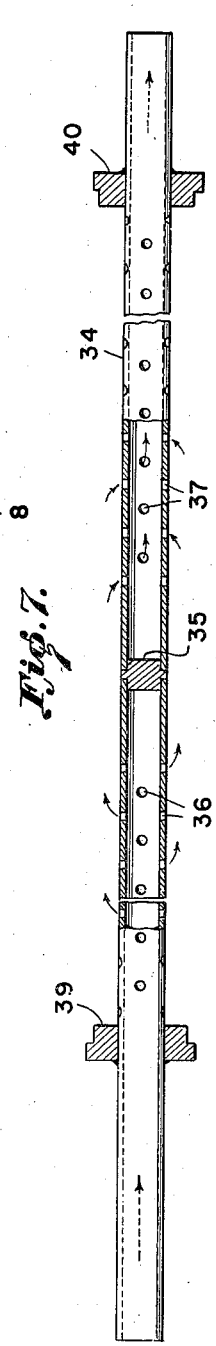
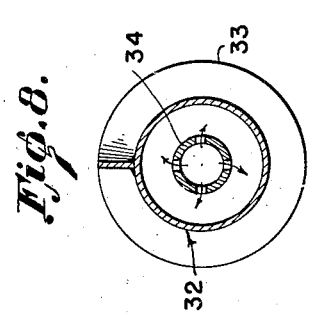
INVENTOR
G. T. HEMMETER

Patented July 16, 1946

2,403,923

UNITED STATES PATENT OFFICE 2,403,923

DEVICE FOR PEELING AGRICULTURAL PRODUCTS

George T. Hemmeter, Berkeley, Calif., assignor to the United States of America, as represented by the Secretary of Agriculture Application June 25, 1943, Serial No. 492,303

2 Claims. (Cl. 99—443)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a device for removing peelings from agricultural products, such as potatoes, carrots, onions, and so forth, and has among its objects the provision of a device which requires little handling of the products, which loosens or removes the peelings to a uniform depth over the surface of the product regardless of irregularities therein, which can be regulated to cause removal to different depths or regulated for use with different products, and such other objects as will be apparent from the following description, appended claims and annexed drawings.

When potatoes, or other products, are exposed to high-temperature radiant heat for a short interval of time, the outer peelings and immediate under-surfaces are cooked, undergoing combustion or oxidation, and are thereby partially converted to gases, which escape from the surfaces, and partially to carbonaceous surface layers. Such layers are subsequently readily removed.

In general, the device comprises means for producing high-temperature gases and regulated radiant heat, and means for conveying the products through the heat for a regulated short interval of time under conditions that expose all surfaces of the products to the heat under substantially the same conditions of heat intensity and time.

For a detailed description of the device, attention is directed to the annexed drawings, in which:

Figure 5 is a section on the line 5—5 of Figure 3;

Figure 6 is a partial detail of a conveyor roll;

Figure 7 is a detail of Figure 6; and

Figure 8 is a section on the line 8—8 of Figure 6.

Figure 1:
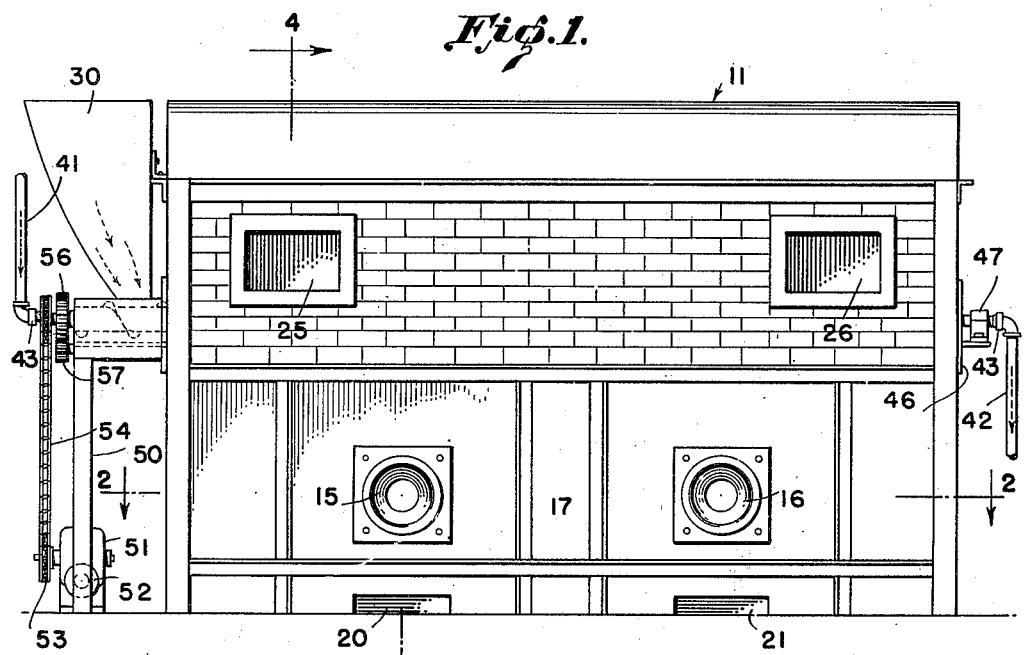
Figure 1 is a front elevation with some parts removed for clearness in illustration.
Figure 2:
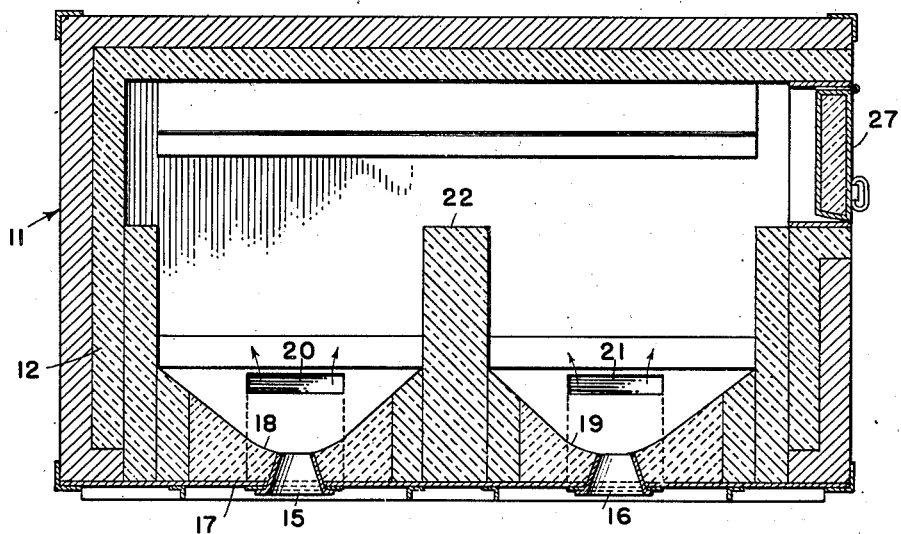
Figure 2 is a section on the line 2—2 of Figure 1.
Figure 3:
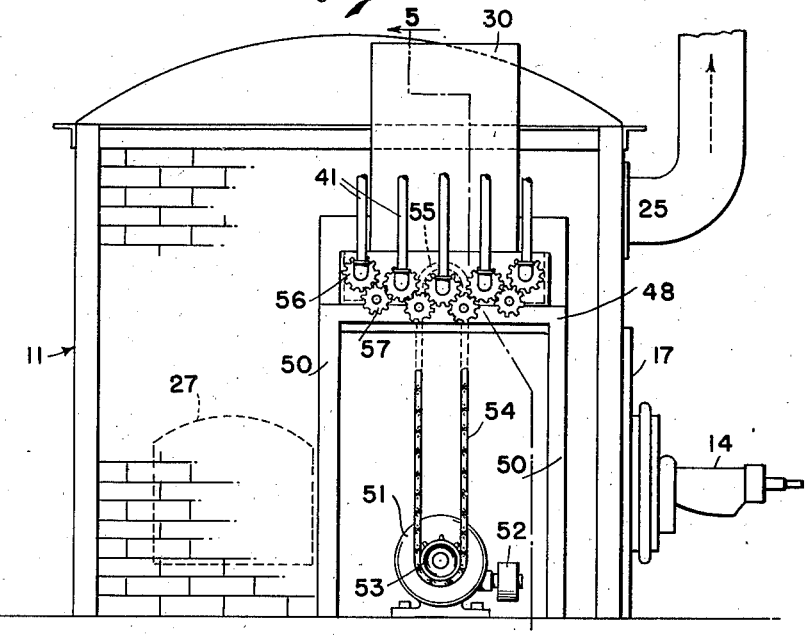
Figure 3 is an end elevation.

Referring to the drawings in detail, the radiant heat is supplied by a furnace 11 having an inner wall layer 12 of fire-brick and an outer wall layer 13 of ordinary building brick. Regulated heat is supplied by any desirable means, such as an ordinary oil burner 14, the particular furnace herein illustrated being provided with two such burners.

Figure 4:
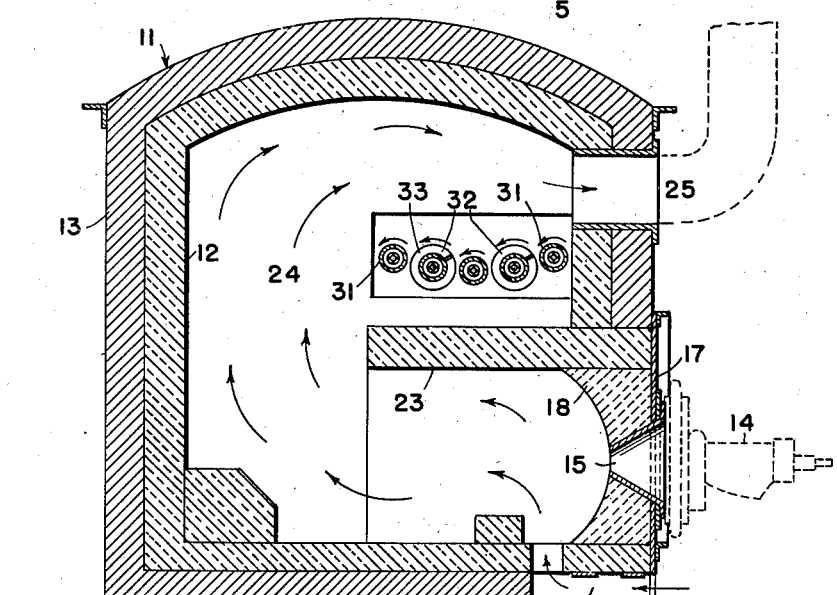
Figure 4 is a section on the line 4—4 of Figure 1.

Entrance openings are provided for the burners by means of thimbles 15 and 16 held by a face plate 17 and set in refractory material at 18 and 19. Combustion air is admitted through draft ports 20 and 21 and combustion takes place in combustion chambers having a vertical wall 22 forming a partition between the chambers and a horizontal wall 23 forming a combustion chamber ceiling. Wall 23 extends partially across the furnace thus to provide an opening for egress of the combustion gases as shown in Figure 4. The hot gases pass through the opening and then pass through the main chamber 24 of the furnace, heating the fire-brick layer 12, particularly the ceiling, and thence pass out of the furnace through exhaust ducts 25 and 26 located near the ceiling. An inspection door 27 opens into the furnace. Heat sources other than oil burners may, of course, be used provided the furnace design is such as to heat the fire-brick, especially at the ceiling of the furnace.

The conveyor is provided with a hopper 30 through which is fed the raw products onto the conveyor at one end thereof outside the furnace. The products are conveyed through apertures in the end walls of the furnace, thus carrying them through the heat rays which radiate from the ceiling of the furnace, and out of the furnace at the other end of the conveyor. The conveyor is situated below the ducts 25 and 26 and the products are therefore substantially free from contact with the hot combustion gases.

The conveyor comprises essentially a set of horizontally extending cylindrical rolls 31 and a set of conveying rolls 32, each conveying roll being provided with a spiral fin 33 of heat-resistant material, but being otherwise similar to the cylindrical rolls and located alternately between them. All rolls are arranged parallel in such manner that they form a slightly trough-shaped products-holding space at their upper sides and are geared to rotate in the same direction, such that products fed onto them from the hopper 30 are moved toward the other end of the conveyor by action of the spiral fins and are also tumbled about while passing through the radiant heat. The conveyor is positioned above the wall 23 beside the opening, which wall acts as a baffle to direct hot gases from the combustion chamber away from the products and against the furnace ceiling, thus protecting products and rolls from the direct heat of combustion.

Special means is provided for cooling the rolls, since they are continuously subjected to the heat rays in the furnace, and if not cooled they become sufficiently hot to damage the conveyed products, and are themselves burned. Referring in particular to Figures 6, 7 and 8, each roll is provided with an axial tube 34 open at both ends and having a stop 35 at an intermediate point. Apertures 36 and 37, extending through the wall of the tube, are provided on opposite sides of the stop, respectively. An imperforate tube 38 forming the outer wall of the roll surrounds at least the apertured portion of the axial tube, and is mounted and held spaced therefrom by end closure plates 39 and 40 to which it is secured fluid-tight. Thus, a cooling fluid, such as water, when passed into one end of the axial tube flows out of one set of apertures, such as apertures 36, thence between the axial tube and surrounding imperforate tube, thence into the other set of apertures 37, and finally out of the other end of the axial tube.

Means for feeding cooling fluid into and out of the opposite ends of the axial tube is provided by a fluid-tight rotatable pipe-joint at each end, coupled to inlet and outlet pipes 41 and 42, respectively. Each rotatable joint comprises a stationary coupling member 43 rotatably receiving the end of the axial tube and provided with a packing 44 and packing compression nut 45.

The rolls are rotatably supported at the exit end of the conveyor by a bracket 46 attached to the furnace wall and carrying bearings 47 in each of which the exit end of an axial tube is journaled, and at the entrance end on a cross-member 48 carrying bearings 49 in each of which the entrance end of the axial tube is journaled. Legs 50, one attached to each end of the cross-member, support it on the floor.

Means for rotating all the rolls is provided by a speed-reducing transmission 51 having a power pulley 52 which may be driven by any desired power means, such as a variable speed motor (not shown) thus to regulate the interval of time of exposure of the products to the heat, and having a sprocket 53 for driving a chain 54, which in turn drives a sprocket 55 attached to the entrance end of one of the axial tubes. The other rolls are driven by gears 56, one attached to the entrance end of each of the axial tubes, and idler gears 57 geared with adjacent gears 56 and rotatably supported on the cross-member 48, resulting in rotation of all rolls in the same direction, in the manner illustrated.

The products to be peeled are fed from hopper 30 and are moved through the furnace on the conveyor. While passing through the furnace, the products are tumbled about, resulting in a substantially uniform exposure of all their sides to the radiant heat. The temperature of the furnace and the conveyor speed can be so regulated that the products are heat penetrated to any desired depth, preferably only through the peelings to char, burn or carbonize them, without substantially affecting the under-surfaces, and the peelings can then readily be removed by spraying with a jet of water or, in some cases, with a jet of air, or by other means, such as by scrubbing with a brush under liquid or in a liquid spray, tumbling in a corrugated surface, rotary drum, washer or similar device.

In general, a high temperature and short time of exposure to the heat rays are the most satisfactory, as this results in a minimum depth of heat penetration, but with complete charring, burning or carbonizing of the peelings. With potatoes, for example, an exposure for too long an interval at a relatively low temperature (1200°–1400° F.) results in heat penetrating the potatoes to a depth below the peelings. The affected under-layers of the potatoes being soft are, therefore, also removed with a corresponding wastage of the products.

Having thus described the invention, what is claimed is:

1. A device for peeling agricultural products, comprising a furnace having a combustion chamber, a furnace ceiling which becomes heated to provide high-temperature radiant heat, and a wall forming a ceiling for the combustion chamber, said wall providing an opening for egress of the combustion gases, and means for conveying products through the furnace and for tumbling them about, thereby to expose all surfaces of the products to the radiant heat under substantially the same conditions of heat ray intensity and interval of time and to heat penetrate the peelings without substantially affecting the under-surfaces to render the peelings readily removable from the unaffected under-surfaces, said conveying means being located above the wall beside the opening and under the furnace ceiling, said wall acting as a baffle to direct hot gases from the combustion chamber away from the products and against the furnace ceiling, the furnace also having exhaust ducts located near the ceiling above the conveying means to carry off the exhaust hot gases without substantial contact of the gases with the products.

2. The device of claim 1, wherein the conveying means comprises horizontally extending rolls having means providing for circulating a cooling fluid through them.

GEORGE T. HEMMETER.